US010689476B2

(12) United States Patent
Holtgrewe et al.

(10) Patent No.: US 10,689,476 B2
(45) Date of Patent: Jun. 23, 2020

(54) OXAZOLIDINONE- AND ISOCYANURATE-CROSSLINKED MATRIX FOR FIBER-REINFORCED MATERIAL

(71) Applicant: Henkel AG & Co. KGaA, Duesseldorf (DE)

(72) Inventors: Christian Holtgrewe, Duesseldorf (DE); Harald Küster, Duesseldorf (DE); Thomas Bachon, Duesseldorf (DE); Andreas Ferencz, Duesseldorf (DE); Olaf Lammerschop, Krefeld (DE); Rainer Schönfeld, Duesseldorf (DE); Claudia Mai, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 15/622,750

(22) Filed: Jun. 14, 2017

(65) Prior Publication Data
US 2018/0051119 A1 Feb. 22, 2018

Related U.S. Application Data

(63) Continuation of application No. PCT/EP2015/080470, filed on Dec. 18, 2015.

(30) Foreign Application Priority Data

Dec. 22, 2014 (DE) ........................ 10 2014 226 838

(51) Int. Cl.
| | |
|---|---|
| *C08G 18/00* | (2006.01) |
| *C08G 18/20* | (2006.01) |
| *C08J 5/04* | (2006.01) |
| *C08G 18/76* | (2006.01) |
| *C08G 18/22* | (2006.01) |
| *C08G 18/16* | (2006.01) |
| *B29C 70/48* | (2006.01) |
| *B29K 63/00* | (2006.01) |
| *B29K 105/00* | (2006.01) |

(52) U.S. Cl.
CPC ......... *C08G 18/003* (2013.01); *C08G 18/168* (2013.01); *C08G 18/2018* (2013.01); *C08G 18/2027* (2013.01); *C08G 18/227* (2013.01); *C08G 18/7621* (2013.01); *C08G 18/7671* (2013.01); *C08J 5/04* (2013.01); *B29C 70/48* (2013.01); *B29K 2063/00* (2013.01); *B29K 2105/0014* (2013.01); *C08J 2363/02* (2013.01); *C08J 2375/04* (2013.01)

(58) Field of Classification Search
CPC .. C08G 18/168; C08G 18/003; C08G 18/227; C08G 18/7621; C08G 18/2018
See application file for complete search history.

(56) References Cited

U.S. PATENT DOCUMENTS

| 3,635,894 A | * | 1/1972 | Dowbenko ........ C08G 59/4021 525/375 |
|---|---|---|---|
| 4,129,554 A | | 12/1978 | Karasawa et al. |
| 4,138,372 A | * | 2/1979 | Nishikawa ........... C08G 18/003 525/504 |
| 4,564,651 A | | 1/1986 | Markert et al. |
| 4,631,306 A | | 12/1986 | Markert et al. |
| 4,680,222 A | | 7/1987 | Anton |
| 5,036,135 A | | 7/1991 | von Gentzkow et al. |
| 5,223,598 A | * | 6/1993 | Yamada ............... C08G 18/165 528/48 |
| 5,266,662 A | | 11/1993 | Jakob et al. |
| 5,288,833 A | * | 2/1994 | Parodi .................. C07C 215/90 502/172 |
| 5,314,983 A | * | 5/1994 | DeMeuse ............. C08G 18/003 522/166 |
| 6,670,006 B1 | | 12/2003 | Sugimori et al. |
| 2010/0240816 A1 | | 9/2010 | Liao et al. |
| 2010/0311916 A1 | | 12/2010 | Tzou et al. |
| 2011/0160327 A1 | | 6/2011 | Occhielio et al. |
| 2012/0214958 A1 | * | 8/2012 | Marks .................... C08G 59/02 528/73 |
| 2013/0109829 A1 | * | 5/2013 | Yokoyama ......... C08G 18/7664 528/59 |
| 2014/0037966 A1 | | 2/2014 | Renkel et al. |

(Continued)

FOREIGN PATENT DOCUMENTS

| DE | 2359386 A1 | 6/1974 |
|---|---|---|
| DE | 2721780 A1 | 11/1977 |
| DE | 3323084 A1 | 1/1985 |
| DE | 4130329 A1 | 3/1993 |

(Continued)

OTHER PUBLICATIONS

International Search Report for International PCT Patent Application No. PCT/EP2015/080470 dated Mar. 11, 2016.
Johann Weinert et al., Angew. Makro. Chem 1979, 78, 1.
Anuradha Varshney et al. Adv. Apll. Sci. Res. 2012, 2, 2553.
Xavier Ramis et al. J. Appl. Poly. Sci. 2012, 125, 2779.
Dow Product Information, D.E.R. 331 Liquid Epoxy Resin, Appendix 1, 5 pages.

*Primary Examiner* — Michael L Leonard
(74) *Attorney, Agent, or Firm* — James E. Piotrowski

(57) ABSTRACT

The present invention relates to a method for producing a cured composition, which has at least one oxazolidinone ring and at least one isocyanurate ring and is crosslinked thereby, starting from a liquid reaction mixture comprising: (a) at least one liquid, aromatic epoxy resin; (b) at least one liquid, aromatic polyisocyanate; and (c) a catalyst composition; relative to the at least one polyisocyanate, the at least one epoxy resin is used in amounts such that the molar equivalent ratio of epoxide groups to isocyanate groups is at least 0.4; and curing the reaction mixture to give a cured polymer composition comprising at least one oxazolidinone ring and at least one isocyanurate ring, and also to the cured compositions obtainable by these methods.

18 Claims, No Drawings

(56) References Cited

U.S. PATENT DOCUMENTS

| | | | | |
|---|---|---|---|---|
| 2015/0218375 A1* | 8/2015 | Hupka | ............... | C08G 18/4045 523/400 |
| 2015/0361331 A1* | 12/2015 | Tanguay | ................. | C09K 8/62 166/280.2 |

FOREIGN PATENT DOCUMENTS

| | | |
|---|---|---|
| DE | 102011007896 A1 | 10/2012 |
| EP | 0130454 A2 | 1/1985 |
| EP | 0135689 A1 | 4/1985 |
| EP | 0408990 A2 | 1/1991 |
| EP | 0444956 A2 | 9/1991 |
| EP | 0478606 B1 | 12/1994 |
| EP | 0563316 B1 | 3/1995 |
| GB | 1447500 A | 8/1976 |
| JP | 2011500950 A | 1/2011 |
| WO | 9015089 A1 | 12/1990 |
| WO | 9211304 A1 | 7/1992 |
| WO | 9844017 A1 | 10/1998 |
| WO | 0034351 A1 | 6/2000 |
| WO | 2007096216 A1 | 8/2007 |
| WO | 2008110602 A1 | 9/2008 |
| WO | 2008147641 A1 | 12/2008 |
| WO | 2009045835 A1 | 4/2009 |
| WO | 20120039999 | 3/2012 |

\* cited by examiner

OXAZOLIDINONE- AND ISOCYANURATE-CROSSLINKED MATRIX FOR FIBER-REINFORCED MATERIAL

The present invention relates to a method for producing a cured composition, which comprises at least one oxazolidinone ring and at least one isocyanurate ring and is crosslinked thereby, proceeding from a reaction mixture comprising at least one epoxide, at least one isocyanate and a catalyst, and to the cured composition obtainable thereby.

While commercially available resin systems, which have high glass transition temperatures, are suitable for producing molded parts that are able to withstand the high temperatures that occur during electrophoretic deposition (dip coating), they are disadvantageous due to low stability during storage and long curing cycles.

The international patent publication WO 2008/147641 describes solid polyepoxide- and polyisocyanate-based resin systems, which form oxazolidinone and isocyanurate rings during curing. These resin systems, however, have the disadvantage that they cannot be employed in the frequently used RTM methods, which necessitate liquid resin systems.

Since such molded parts, and in particular carbon fiber-reinforced plastic parts, are used in the construction of automobiles, there is a need for polymer systems that overcome the known disadvantages, yet still have the requisite mechanical properties.

The present invention is based on the finding made by the inventors that, when using polyepoxide or polyisocyanate monomers that are stable at room temperature and have a low viscosity at certain ratios, it is possible to produce oxazolidinone- and isocyanurate-crosslinked plastic materials in short curing cycles, which have high glass transition temperatures and can thus be employed in manufacturing processes in which these plastic materials are exposed to high temperatures. The plastic materials thus obtainable furthermore exhibit advantageous mechanical properties, and in particular high impact resistance, which is suitable for use in the construction of automobiles. Furthermore, it is possible to vary the performance and properties of the polymers thus obtainable across a wide range by controlling the curing conditions and the type of the catalyst systems. Finally, such systems are also advantageous to the effect that these remain stable at room temperature and therefore do not need to be stored under cooled conditions.

Surprisingly, it has now been found that reaction mixtures that comprise at least one liquid, aromatic epoxy resin, at least one liquid, aromatic polyisocyanate and a suitable catalyst composition, upon curing yield oxazolidinone- and isocyanurate-crosslinked polymer compositions that have a high glass transition temperature and high mechanical durability, and are therefore particularly suitable for producing automobile parts, and in particular carbon fiber-reinforced plastic molded parts.

In a first aspect, the present invention thus relates to a method for producing a cured polymer composition comprising at least one oxazolidinone ring and at least one isocyanurate ring, the method comprising the following steps:

(1) providing a liquid reaction mixture, comprising:
(a) at least one liquid, aromatic epoxy resin;
(b) at least one liquid, aromatic polyisocyanate; and
(c) a catalyst composition,
wherein the at least one epoxy resin, relative to the at least one polyisocyanate, is used in amounts so that the molar equivalent ratio of epoxide groups to isocyanate groups is at least 0.4, in particular at least 0.7, more preferably at least 1, and still more preferably 1:1; and (2) curing the reaction mixture so as to obtain a cured polymer composition comprising at least one oxazolidinone ring and at least one isocyanurate ring.

In a further aspect, the present invention relates to a cured composition obtainable by way of the methods described herein.

"At least one," as used herein, refers to 1 or more, for example 1, 2, 3, 4, 5, 6, 7, 8, 9, or more. In connection with components of the catalyst compositions described herein, this information does not refer to the absolute amount of molecules, but to the type of the component. "At least one epoxy resin" therefore signifies, for example, one or more different epoxy resins, which is to say one or more different types of epoxy resins. Together with quantities, the quantities refer to the total amount of the correspondingly identified type of component, as already defined above.

"Liquid," as used herein, denotes compositions that are flowable at room temperature (20° C.) and normal pressure (1013 mbar).

The viscosity of the liquid composition described herein is in particular low enough for the composition to be pumpable and to be able to wet and impregnate fiber materials, for example, such as are used for fiber-reinforced plastic parts. In various embodiments, the reaction mixture has a viscosity of <100 mPa·s at a temperature of 120° C. So as to determine the viscosity, the resin mixture is produced at room temperature using a suitable mixer, and the viscosity is determined on a plate-plate rheometer in oscillation at a rising temperature and a heating rate of 50 K/min.

The epoxy resin may comprise epoxide group-containing monomers, prepolymers and polymers and mixtures thereof, and is hereafter also referred to as an epoxide or epoxide group-containing resin. Suitable epoxide group-containing resins are in particular resins comprising 1 to 10, and preferably 2 to 10, epoxide groups per molecule. "Epoxide groups," as used herein, refers to 1,2-epoxide groups (oxiranes).

The epoxy resins used herein may vary and include conventional and commercially available epoxy resins, which may each be used individually or in combinations of two or more different epoxy resins. In the selection of the epoxy resins, not only the properties of the end product, but also the properties of the epoxy resin play a role, such as the viscosity and other properties that influence processability.

The epoxide group-containing resin is a liquid, aromatic epoxide compound. Examples of suitable resins include, but are not limited to, (poly)glycidyl ethers, which are usually obtained by reacting epichlorohydrin or epibromohydrin with polyphenols in the presence of alkali, or (poly)glycidyl ethers of phenol-formaldehyde novolac resins, alkyl-substituted phenol-formaldehyde resins (epoxy novolac resins), phenol-hydroxybenzaldehyde resins, cresol-hydroxybenzaldehyde resins, dicyclopentadiene-phenol resins, and dicyclopentadiene-substituted phenol resins. Polyphenols suitable for this purpose include, for example, resorcinol, brenzkatechin, hydroquinone, bisphenol A (2,2-Bis(4-hydroxyphenyl)propane), bisphenol F (Bis(4-hydroxyphenyl)methane), 1,1-Bis(4-hydroxyphenyl)isobutane, 4,4-dihydroxybenzophenone, 1,1-Bis(4-hydroxyphenyl)ethane, and 1,5-hydroxynaphthalene. Likewise suitable are diglycidyl ethers of ethoxylated resorcinol (DGER), diglycidyl ethers of resorcinol, brenzkatechin, hydroquinone, bisphenol, bisphenol A, bisphenol AP (1,1-Bis(4-hydroxyphenyl)-1-phenylethane), bisphenol F, bisphenol K, bisphenol S, and tetramethyl bisphenol.

Further suitable epoxy resins are known from the prior art and can be derived from Lee H. & Neville, K., Handbook of Epoxy Resins, McGraw-Hill Book Company, new edition of 1982, for example.

Particularly preferred epoxide group-containing compounds are aromatic glycidyl ethers, in particular diglycidyl ethers, and especially particularly preferably those based on aromatic glycidyl ether monomers. Examples of these include, but are not limited to, diglycidyl or polyglycidyl ethers of polyhydric phenols, which can be obtained by reacting a polyhydric phenol with, an excess of chlorohydrin, such as epichlorohydrin. Such polyhydric phenols include resorcinol, Bis(4-hydroxyphenyl) methane (bisphenol F), 2,2-bis(4-hydroxyphenyl)propane (bisphenol A), 2,2-bis(4'-hydroxy-3',5'-dibromophenyl)propane, 1,1,2,2-tetrakis(4'-hydroxyphenyl) ethane or condensates of phenols with formaldehyde which are obtained under acid conditions, such as phenol novolacs and cresol novolacs.

Diglycidyl ethers of bisphenol A are available, for example, as DER 331 (liquid bisphenol A epoxy resin) and DER 332 (diglycidyl ether of bisphenol A) from Dow Chemical Company, Midland, Mich. While not specifically mentioned, it is also possible to use other epoxy resins available under the trade names DER and DEN from Dow Chemical Company.

The polyisocyanate comprises two or more isocyanate groups and includes any known isocyanate that is suitable for the purpose according to the invention, and it is referred to hereafter also in part as isocyanate or isocyanate group-containing resin.

Isocyanates that are suitable as polyisocyanates in the polyisocyanate component are those comprising two or more isocyanate groups. The polyisocyanates preferably comprise 2 to 10, preferably 2 to 5, especially 2 to 4, and in particular exactly 2 isocyanate groups per molecule. The use of isocyanates having a functionality of more than two may be advantageous in some circumstances, since such polyisocyanates are suitable cross-linking agents.

An aromatic polyisocyanate will be used as the at least one polyisocyanate of the polyisocyanate component. In an aromatic polyisocyanate, the NCO groups are bound to aromatic carbon atoms. Examples of suitable aromatic polyisocyanates include 1,5-naphthylene diisocyanate, 2,4'-, 2,2'- or 4,4'-diphenylmethane diisocyanate (MDI), xylylene diisocyanate (XDI), m- and p-tetramethylxylylene diisocyanate (TMXDI), 2,4- or 2,6-toluylene diisocyanate (TDI), di- and tetraalkyl diphenylmethane diisocyanate, 3,3'-dimethyldiphenyl-4,4'-diisocyanate (TODI), 1,3-phenylene diisocyanate, 1,4-phenylene diisocyanate, and 4,4'-dibenzyl diisocyanate.

The polyisocyanate component can also contain fractions of low molecular weight prepolymers, for example reaction products of MDI or TDI with low molecular weight diols or triols, such as ethylene glycol, diethylene glycol, propylene glycol, dipropylene glycol, triethylene glycol, glycerol or trimethylolpropane. These prepolymers can be produced by reacting an excess of monomeric polyisocyanate in the presence of diols or triols. The number average molecular weight of the diols and triols is generally less than 1000 g/mol. If necessary, the reaction product can be freed from monomeric aromatic isocyanates by way of distillation.

The at least one polyisocyanate preferably has an NCO content of more than 25 wt. %, more preferably of more than 28 wt. %, particularly preferably of more than 30 wt. %, and in particular preferably of more than 30 to 50 wt. %, based on the at least one polyisocyanate. When only one polyisocyanate is used, the percent by weight refers to the amount of this polyisocyanate used, while, when using a mixture of polyisocyanates, it refers to the amount of the mixture of these polyisocyanates used.

The at least one polyisocyanate preferably has a viscosity of less than 80 mPa·s, and in particular of 30 to 60 MPa·s (DIN ISO 2555, Brookfield viscometer RVT, spindle no. 3, 25° C.; 50 rpm).

It is in particular preferred that the at least one polyisocyanate has a number average molecular weight of less than 1500 g/mol, and particularly preferably of less than 1000 g/mol.

Particularly suitable isocyanate group-containing resins are methylene diphenyl diisocyanate (MDI), toluene-2,4-diisocyanate (TDI), polymeric diphenylmethane diisocyanate (PMDI) and mixtures thereof. These polyisocyanates are commercially available from Bayer AG (DE), for example, under the trade names Desmodur and Desmodur® N3300.

Aromatic polyisocyanate monomers, and in particular aromatic diisocyanates, are particularly preferred.

It is generally preferred that both the epoxides used and the isocyanates used are monomers, and in particular liquid, low-viscosity monomers under standard conditions (20° C., 1013 mbar). These are in particular advantageous because they, compared to other higher molecular weight epoxy resins, are considerably more stable, and in particular more storage-stable, and do not need to be stored under cooled conditions.

In various embodiments of the invention, the reaction mixture can contain several different epoxide group-containing compounds and/or several different isocyanate group-containing compounds.

The weight ratio of the at least one epoxy resin and of the at least one polyisocyanate may be varied and depends on the respective compounds used and the chemical and physical properties thereof, as well as the desired physical and chemical properties of the cured composition. In general, the epoxide is used in such amounts that the molar equivalent ratio of epoxide groups to isocyanate groups is at least 0.4, in particular at least 0.7, and more preferably at least 1. The "molar equivalent ratio" here refers to the molar ratio between epoxide groups and isocyanate groups. The molar equivalent ratio is the quotient of epoxide groups to isocyanate groups, wherein twice the number of epoxide groups to isocyanate groups corresponds to a molar equivalent ratio of 2. A molar equivalent ratio of at least 0.4 thus means, for example, that there is a maximum of 2.5 moles isocyanate groups per 1 mole epoxide groups. The molar equivalent ratio of epoxide groups to isocyanate groups is preferably between 0.4 and 5, in particular between 0.5 and 3, more preferably between 0.7 and 2, and still more preferably between 0.9 and 1.5. The inventors have found that the use of these quantity ratios yields particularly advantageous properties with respect to the glass transition temperature, the modulus of elasticity and impact resistance.

The reaction mixture comprises a catalyst composition as a further component. In various embodiments, the catalyst composition does not comprise any curing agents, which is to say compounds that undergo an epoxide polyaddition reaction, such as dicyandiamide, DDS (diaminodiphenyl sulfone) and similar compounds, but only compounds that catalyze the polymerization of polyisocyanate and epoxide. In preferred embodiments, the reaction mixture is therefore free from dicyandiamide or DDS, and preferably entirely free from curing agents such as dicyandiamide or DDS.

"Free from," as used in the present context, shall mean that the amount of the corresponding substance in the reaction mixture is less than 0.05 wt. %, preferably less than 0.01 wt. %, and still more preferably less than 0.001 wt. %, based on the total weight of the reaction mixture.

The catalyst composition can comprise one or more, catalysts. In various embodiments, the catalyst composition is suitable for forming oxazolidinone and isocyanurate rings from the described components.

In various embodiments, the catalyst composition can comprise at least one nitrogen-containing base.

In preferred embodiments, the base is an ionic compound of formula (I).

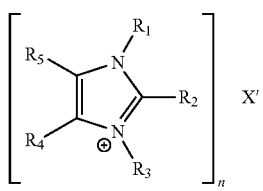

Formula (I)

$R_1$ and R3 in formula (I) are each selected independently of one another from the group consisting of substituted or unsubstituted, linear or branched alkyl having 1 to 20 carbon atoms, substituted or unsubstituted, linear or branched alkenyl having 3 to 20 carbon atoms, and substituted or unsubstituted aryl having 5 to 20 carbon atoms. $R_1$ and R3 are preferably selected from the group consisting of substituted or unsubstituted, linear or branched alkyl having 1 to 10 carbon atoms, and substituted or unsubstituted aryl having 5 to 10 carbon atoms.

The functional groups R4 and R5 are each selected independently of one another from the group consisting of hydrogen, substituted or unsubstituted, linear or branched alkyl having 1 to 20 carbon atoms, substituted or unsubstituted, linear or branched alkenyl having 3 to 20 carbon atoms, substituted or unsubstituted, linear or branched alkoxy having 1 to 20 carbon atoms, and substituted or unsubstituted aryl having 5 to 10 carbon atoms. R4 and R5 in formula (I) are preferably hydrogen.

In various embodiments, (i) $R_1$ and R5 and/or R3 and R4 or (ii) R4 and R5, together with the carbon or nitrogen atoms to which they are bound, can form a 5- or 6-membered substituted or unsubstituted cycloalkyl, cycloheteroalkyl, aryl or heteroaryl ring, wherein the cycloheteroalkyl or heteroaryl ring comprises 1 to 3 heteroatoms selected from O, N and S. In certain embodiments, it is thus possible to combine both $R_1$ and R5 and R3 and R4 with one another to form a ring. It is preferred, however, to combine R4 and R5 with one another, in particular so as to form a 6-membered aryl ring, whereby the resulting compound is a benzimidazolium or benzimidazolidinium.

The anion X of formula (I) may be any known anion that is suitable for the purpose according to the invention, and may serve only charge equalization purposes of the cation of the ionic compound of formula (I). It may be advantageous if the anion does not have any chelating properties. In a preferred embodiment, X is selected from the group consisting of dicyandiamide anion, $F^-$, $Cl^-$, $Br^-$, $I^-$, $OH^-$, $HSO_3^-$, $SO_3^{2-}$, $SO_4^{2-}$, $NO_2^-$, $NO_3^-$, $PO_4^{3-}$, $BF_4^-$, $PF_6^-$, $ClO_4^-$, acetate, citrate, formate, glutarate, lactate, malate, malonate, oxalate, pyruvate, tartrate, cyanocyanamide (This anion can be found in the application of the invention=cyanamide?), $SCN^-$ and $P(OEt)_2O_2^-$. In a particularly preferred embodiment, X is selected from the group consisting of $Cl^-$, $Br^-$, $I^-$, $SO_4^{2-}$, $NO_2^-$, $NO_3^-$, $PO_4^{3-}$, $BF_4^-$, $SbF_6^-$, $PF_6^-$, $ClO_4^-$, acetate, cyanocyanamide (see above), $SCN^-$ and $P(OEt)_2O_2^-$.

"-----" denotes a single or double bond, and in particular a double bond.

The subscript n is 1, 2 or 3.

The catalyst compositions described herein may comprise several different ionic compounds of formula (I).

"Alkyl," as used herein, refers to linear or branched alkyl groups, such as methyl, ethyl, n-propyl and iso-propyl. The alkyl functional groups can be substituted or unsubstituted, but are preferably unsubstituted. If they are substituted, the substituents are in particular selected from the group consisting of $C_{6-10}$ aryl, —OR, —NRR', wherein R and R' can each, independently of one another, be H or unsubstituted $C_{1-10}$ alkyl.

"Alkenyl," as used herein, refers to linear or branched alkenyl groups containing at least one C=C double bond, such as ethenyl, n-propenyl, iso-propenyl and n-butenyl. The alkenyl functional groups can be substituted or unsubstituted, but are preferably unsubstituted. If they are substituted, the substituents are in particular selected from the group consisting of $C_{6-10}$ aryl, —OR, —NRR', wherein R and R' can each, independently of one another, be H or unsubstituted $C_{1-10}$ alkyl.

"Aryl," as used herein, refers to aromatic groups that can comprise at least one aromatic ring, but also several condensed rings, such as phenyl, napthyl, anthracenyl and the like. The aryl functional groups can be substituted or unsubstituted. If they are substituted, the substituents are selected from the group consisting of $C_{1-10}$ alkyl, $C_{2-10}$ alkenyl, —OR, —NRR', wherein R and R' can each, independently of one another, b H or unsubstituted $C_{1-10}$ alkyl.

In various embodiments of the invention, the compound of formula (I) is a 1,3-substituted imidazolium compound, which is to say $R_2$, $R_4$ and $R_5$ are hydrogen. The substituents $R_1$ and $R_3$ are preferably selected from unsubstituted $C_{1-4}$ alkyl functional groups, in particular methyl and ethyl, which is to say the compounds are, for example, 1-ethyl-3-methylimidazolium compounds, or from unsubstituted or substituted $C_6$ aryl functional groups, and in particular phenyl substituted with one or more $C_{1-4}$ alkyl substituents, such as 2,6-diisopropylphenyl.

The anion may in particular be acetate, chloride, thiocyanate, diethyiphosphate or dicyanamide.

In various embodiments, the compound of formula (I) is selected from 1-ethyl-3-methyl-1H-imidazolium acetate, 1-ethyl-3-methyl-1H-imidazolium thiocyanate, 1-ethyl-3-methyl-1H-imidazolium cyanocyanamide, 1-ethyl-3-methyl-1H-imidazolium diethylphosphate, and 1,3-bis(2,6-diisopropylphenyl)-1H-imidazolidinium chloride.

In various other embodiments, the base used as the catalyst is a non-ionic nitrogen-containing base, which contains at least one tertiary nitrogen atom and/or an imine nitrogen atom.

The term "tertiary," as used herein, indicates that three organic functional groups are covalently bound by way of single bonds to the nitrogen atom present in the at least one base.

As an alternative, the at least one base can comprise an imine nitrogen atom. The term "imine," as used herein, refers to the known family and indicates that the nitrogen atom comprises a covalent double bond to an organic functional group and a covalent single bond to a further organic functional group. Imines are Schiff bases.

The catalyst composition can, in various embodiments, comprise several of the above-described non-ionic bases, for example a base comprising an imine nitrogen and a base comprising a tertiary nitrogen atom. The non-ionic base can be both a tertiary amine and an imine by comprising both a tertiary nitrogen atom and an imine nitrogen.

In various embodiments, the at least one non-ionic base is a tertiary amine of formula (II) $NR_6R_7R_8$ and/or an imine of formula (III) $N(=R_9)R_{10}$.

The functional groups $R_6$ to $R_8$ and $R_{10}$ are each selected independently of one another from the group consisting of substituted or unsubstituted, linear or branched alkyl having 1 to 20 carbon atoms, substituted or unsubstituted, linear or branched alkenyl having 3 to 20 carbon atoms, and substituted or unsubstituted aryl having 5 to 20 carbon atoms, or at least two of $R_6$ to $R_8$, together with the nitrogen atom to which they are bound, form a 5- to 10-membered, heteroalicyclic ring or heteroaryl ring, which optionally comprises one or more further nitrogen atoms, and in particular 1 further nitrogen atom.

$R_9$ is a substituted or unsubstituted, linear or branched alkylenyl having 3 to 20 carbon atoms, or $R_9$ and $R_{10}$, together with the nitrogen atom to which they are bound, form a 5- to 10-membered, heteroalicyclic ring or heteroaryl ring, which optionally comprises further nitrogen atoms.

"Alkylenyl," as used herein, refers to an alkyl functional group, which is bound by way of a double bond to the nitrogen atom. If substituted, the substituents are defined as described above for alkyl functional groups.

In various embodiments of the embodiments, the tertiary amine bases or the imine bases are cyclic compounds that comprise at least two nitrogen atoms, which is to say at least two of the functional groups $R_6$ to $R_{10}$ combine with one another so as to form a ring together with the nitrogen atom to which they are bound, and moreover comprise a further nitrogen atom in the form of a functional group —NRR', wherein the nitrogen atom is a ring atom and the functional group R or R' is involved in the ring formation. Imidazole- or imidazolidine-based bases are particularly preferred. In various embodiments, the bases are thus imidazole derivatives, for example, such as 1-alkylimidazole or 2,4-dialkylimidazole.

In various embodiments, the at least one non-ionic base is selected from the group consisting of 1-methylimidazole and 2,4-ethylmethylimidazole.

In various particularly preferred embodiments, the catalyst composition according to the invention comprises at least one compound of formula (I) and at least one non-ionic nitrogen-containing base, which preferably contains a tertiary nitrogen atom and/or an imine nitrogen, wherein both are defined as described above. In such compositions, the non-ionic base used according to the invention can preferably be a non-ionic, nitrogen-containing base, which is able to deprotonate the ionic compound of formula (I) at the 2-position. This means that the base has a corresponding acid having an acidity constant pKs which is greater than the acidity constant of the H atom at position 2 of the compound of formula (I) (pKs (base)>pKs (compound of formula (I)). The difference in the acidity constant is preferably at least 1. In various embodiments, the corresponding acid of the base has a pKs value of 10 or more, and in particular of 12 to 14 or more. "Corresponding acid," as used in the present context, refers to the protonated form of the base.

In various embodiments, such a catalyst composition comprises a 1-ethyl-3-methyl-1H-imidazolium salt, and in particular thiocyanate, as the compound of formula (I) and 2,4-ethylmethyl imidazole as the non-ionic nitrogen-containing base.

The catalyst composition can comprise the at least one non-ionic compound of formula (I) and the at least one non-ionic base in a weight ratio of 10:1 to 1:10, for example, preferably 3:1 to 1:3, and particularly preferably of 1.1:1 to 1:1.1.

In a preferred embodiment, 0.01 to 10 wt. %, especially 0.1 to 5 wt. %, and preferably 1 wt. % of the catalyst composition (c) is used, based on the total amount of the epoxide (a) and the isocyanate (b).

"Providing," as used herein, refers to mixing the components of the reaction mixture in any arbitrary order. It may be advantageous, for example, to initially combine two or more components, and optionally mix these to form a heterogeneous or homogeneous mixture, before the remaining components are added. For example, initially that least one epoxide group-containing compound and the catalyst composition can be combined and mixed and thereafter, for example just prior to curing, the at least one isocyanate group-containing compound can be added, and the remaining, previously mixed components can be admixed. Between the various combination and mixing steps, it may be advantageous to cool the reaction mixture to room temperature.

In general, the individual components of the reaction mixture can be used either as such or in the form of a solution in a solvent, for example an organic solvent or a mixture of organic solvents. Any known solvent that is suitable for the purpose according to the invention may be used. The solvent can be an organic solvent having a high boiling point, for example. The solvent may be selected from the group consisting of petroleum, benzene, toluene, xylene, ethylbenzene and mixtures thereof. Since the epoxide and isocyanate compounds are preferably selected from liquid, low-viscosity monomers, it is furthermore possible in various embodiments to use the catalyst composition in the form of a solution, as described above.

In various embodiments, the reaction mixture comprises additional components, such as are known per se and customary in the prior art, in addition to the epoxide (a), the isocyanate (b) and the catalyst composition (c).

For example, a modified resin may be used as a further component, which imparts improved impact resistance and low-temperature properties to the compositions obtainable after curing. Modified epoxide group-containing resins of this type are known from the prior art and comprise reaction products of epoxy resins having an epoxide functionality of more than 1 with carboxy-functional rubbers, dimer fatty acids or what are known as core/shell polymers, the cores of which have a glass transition temperature of less than −30° C. In this case, the epoxide group-containing resin is preferably used in stoichiometric excess and yields an epoxide-functional reaction product. The excess of epoxide group-containing resin may also far exceed the stoichiometric excess. An epoxide functionality of greater than 1 means that the compounds comprise more than 1, and preferably at least 2, 1,2-epoxide groups per molecule. Modified epoxide group-containing resins that have an epoxide equivalent weight between 150 and 4000 are advantageous. Epoxide group-containing resins can also be modified in particular with a copolymer of a 1,3-diene or an ethylenically unsaturated comonomer and/or with core/shell particles (CSR core-shell rubber). These modified resins are used in addition to the epoxy resin (a) and the isocyanate (b).

As an alternative or in addition to the above-mentioned components, it is also possible to use other impact modifiers (tougheners), such as polyols, and in particular polyalkylene glycols, such as polypropylene glycol, or liquid rubbers. The compositions preferably contain an impact modifier, preferably such as one described above. When an impact modifier is additionally used, the K1c value increases significantly, wherein surprisingly the Tg value does not change at all or only little.

The reaction mixture described herein can be combined with further components, such as the above-described impact modifiers, in the form of an adhesive composition or an injection resin.

Such adhesive compositions or injection resins can contain a plurality of other components, all of which are known a person skilled in the art, which include, but are not limited to, frequently used auxiliaries and additives, such as fillers, plasticizers, reactive and/or non-reactive diluents, superplasticizers, coupling agents (such as silanes), adhesion promoters, wetting agents, adhesives, flame retardants, wetting agents, thixotropic agents and/or rheological auxiliaries (such as fumed silica), aging and/or corrosion inhibitors, stabilizers, and/or dyes. Depending on the requirement in regard to the adhesive or the injection resin and the application thereof, and with respect to production, flexibility, strength and bonding with substrates, the auxiliaries and additives are incorporated into the composition in varying amounts.

In various embodiments of the invention, depending on the desired use the reaction mixture is applied to a substrate, for example when used as an adhesive, or loaded into a molding tool, when used as a molding compound for producing plastic parts. In preferred embodiments, the method is a transfer molding (RTM) method, and the reaction mixture is a reactive injection resin. "Reactive," as used in the present context, refers to the fact that the injection resin can be chemically crosslinked. In the RTM method, providing the reaction mixture, which is to say step (1) of the described method, can include loading, and in particular injecting, the injection resin into a molding tool. When fiber-reinforced plastic parts are being produced, for which the described methods and reaction mixtures are particularly suitable, fibers or semi-finished fiber products (prewovens/preforms) can be placed in the molding tool prior to injection. The fibers and/or semi-finished fiber products used can be the materials known for this application in the prior art, and in particular carbon fibers.

The invention furthermore relates to reaction mixtures described in connection with the methods, which is to say resin compositions that comprise at least one epoxide group-containing resin (a), a polyisocyanate (b), and a catalyst composition (c), each as defined above.

In various embodiments, such resin compositions are adhesive compositions or injection resins. The injection resins are preferably pumpable and in particular suitable for transfer molding (RTM process). In various embodiments, the reaction mixture thus has a viscosity of <100 mPa·s at a temperature of 120° C., which is to say a typical infusion temperature. So as to determine the viscosity, the resin mixture is produced at room temperature using a suitable mixer, and the viscosity is determined on a plate-plate rheometer in oscillation at a rising temperature and a heating rate of 50 K/min.

In one embodiment, the invention thus also relates to the molded compounds obtainable in the RTM process by way of the resin systems according to the invention. The RTM method, in which the described resin systems (polymer compositions) can be used, are known per se from the prior art and can be readily adapted by a person skilled in the art such that the reaction mixture according to the invention can be employed.

The open times of the resin compositions (reaction mixture), as described herein, are preferably greater than 90 seconds, and particularly preferably are in the range of 2 to 5 minutes, and in particular approximately 3 minutes. "Approximately," as used herein in connection with a numerical value, denotes the numerical value ±10%.

Depending on the type of epoxides and isocyanates used, and depending on the catalyst composition and the use of the cured composition, the reaction mixture can be cured in step (2) of the method according to the invention at differing reaction temperatures. The curing temperature can range between 10° C. and 230°, for example. In general, curing will take place at an elevated temperature, which is to say >25° C. It is preferable to cure the resins between 50° C. and 190° C., and preferably between 90° C. and 150°. The duration of the curing process likewise depends on the resins to be cured and the catalyst composition and can range between 0.01 hours and 10 hours. The curing cycle preferably lasts a few minutes, which is to say in particular 1 to 5 minutes. The curing process can take place in one stage or multiple stages.

During curing, the epoxide group-containing resin reacts with the isocyanate in the presence of the catalyst, forming at least one oxazolidinone, which crosslinks the resins with one another and, among other things, imparts the advantageous physical properties to the cured composition. The at least one oxazolidinone formed during curing can be one of 1,2-oxazolidin-3-one, 1,2-oxazolidin-4-one, 1,2-oxazolidin-5-one, 1,3-oxazolidin-2-one, 1,3-oxazolidin-4-one, or 1,3-oxazolidin-5-one. The cured composition may also comprise several different of the aforementioned oxazolidinone isomers.

Moreover, the isocyanate groups react among one another in the presence of the catalyst composition described herein, forming at least one isocyanurate, which crosslinks the resins with one another and likewise contributes to the advantageous properties of the cured composition.

The resins cured by way of the catalyst systems and methods described herein preferably have a critical stress intensity factor K1c of >0.5, and preferably of at least 0.6. In various embodiments, the glass transition temperature of the cured resins is in the range of more than 100° C., in particular more than 150° C., and typically in the range of up to 200° C. The modulus of elasticity of the cured resins is preferably at least 2500 N/mm$^2$, preferably at least 3000 N/mm$^2$, and typically in the range of 2500 to 5000 N/mm$^2$.

The present invention furthermore relates to the cured composition obtainable according to the method described herein. Depending on the method, it may be present in the form of a molded part, and in particular a fiber-reinforced plastic molded part. Such molded parts are preferably used in the construction of automobiles.

For example, the cured polymer composition is particularly suitable as a matrix resin for fiber composites. These can be used in various application methods, for example in the resin transfer molding (RTM) method or in the infusion method.

Known high-strength fiber materials are suitable as fiber components for fiber composites. These can be, for example, glass fibers; synthetic fibers, such as polyester fibers, polyethylene fibers, polypropylene fibers, polyamide fibers, polyimide fibers or aramide fibers; carbon fibers; boron fibers; oxidic or non-oxidic ceramic fibers such as aluminum oxide/silicon dioxide fibers, silicon carbide fibers; metal fibers, for example made of steel or aluminum; or natural fibers, such as flax, hemp or jute. These fibers can be introduced in the form of mats, woven fabrics, knitted fabrics, laid scrims, non-woven fabrics or rovings. It is also possible to use two or more of these fiber materials in the form of a mixture. It is possible to select short fibers; preferably, however, synthetic long fibers are employed, and in particular woven and knitted fabrics. Such high-strength fibers, laid scrims, woven fabrics and rovings are known to a person skilled in the art.

In particular, the fiber composite is to comprise fibers in percent by volume of more than 40 vol. %, preferably more than 50 vol. %, and in particular preferably between 50 and 70 vol. %, based on the total fiber composite, so as to achieve particularly good mechanical properties. In the case of carbon fibers, the percent by volume is determined in accordance with the standard DIN EN 2564:1998-08, and in the case of glass fibers it is determined in accordance with the standard DIN EN ISO 1172:1998-12.

Such a fiber composite is suitable in particular for an automobile component. Such fiber composites have several advantages over steel; for example, they are lighter in weight, stand out with improved crash resistance, and are also more durable.

In addition, it goes without saying that all embodiments disclosed above in connection with the methods according to the invention can also be applied to the described resin systems and cured compositions, and vice versa.

EXAMPLES

DER331 (Dow Chemical, liquid epoxy resin made of epichlorohydrin and bisphenol A) and a catalyst composition were mixed for 30 seconds at 2000 rpm under vacuum in a high-speed mixer. After this mixture cooled to room temperature, methylene diphenyl diisocyanate (MDI) was added and likewise incorporated by mixing for 30 seconds at 2000 rpm under vacuum by way of the high-speed mixer. The reaction mixture was loaded into an upright mold and gelled at room temperature. Thereafter, the mixture was cured in two stages (1 hour at 90° C., and 1 hour at 150° C.). After cooling, the test specimens required for the mechanical tests are milled from the panel thus obtained.

TABLE 1

Components of the reaction mixtures

| Components | Composition | | | | | | | | | |
|---|---|---|---|---|---|---|---|---|---|---|
| | E1 | E2 | E3 | E4 | E5 | E6 | E7 | E8 | E9 | V1 |
| | Initial weight in parts by weight | | | | | | | | | |
| Catalyst composition | 1 | 1 | 1 | 1 | 1 | 1 | 1 | 1 | 0.2 | 1 |
| DER 331 | 50 | 50 | 60 | 40 | 50 | 50 | 50 | 50 | 50 | 30 |
| MDI | 50 | 50 | 40 | 60 | 50 | 50 | 50 | 50 | 50 | 70 |

E: according to the invention;
V: comparative experiment
E1: catalyst = imidazolium + 2,4-EMI
E2: catalyst = 1-methylimidazole
E3: catalyst = 1-methylimidazole
E4: catalyst = 1-methylimidazole
E5: catalyst = 2-phenyl-2-imidazoline
E6: catalyst = N,N-dimethylbenzylamine
E7: catalyst = 2-ethyl-4-methylimidazole
E8: catalyst = 1,8-diazabicyclo[5.4.0]undec-7-ene (DBU)
E9: catalyst = 1,4-diazabicyclo[2.2.2]octane (DABCO)
V1: catalyst = 1-methylimidazole

TABLE 2

Physical properties

| | | E1 | E2 | E3 | E4 | E5 | E6 | E7 | E8 | E9 | V1 |
|---|---|---|---|---|---|---|---|---|---|---|---|
| Tensile test 1B "dog bone" EN-ISO 527/2.3 | EMod in MPa | 3303 | 3210 | 3250 | 4140 | 4601 | — | — | 3489 | 4234 | still tacky after curing |
| | Max. stress in MPa | 53.1 | 29.3 | 75.4 | 11.1 | 29.4 | 38.8 | 19 | 34.5 | 51.2 | |
| | Elongation at rupture in % | 1.65 | 0.92 | 2.67 | 0.25 | 0.64 | 0.88 | 0.5 | 0.99 | 1.23 | |
| | Stress fracture in Mpa | 53.1 | 29.3 | 74.8 | 11.1 | 29.4 | 38.8 | 19 | 34.5 | 51 | |
| 3-point bending test DIN EN-ISO 178 | Emod in MPa | 3745 | 3737 | 2904 | 3995 | 4323 | 2945 | 3038 | 2338 | 3850 | |
| | F max in MPa | 133 | 143 | 157 | 150 | 170 | 21.8 | 32.8 | 23 | 119 | |
| | % compression | 3 | 4.1 | 7.5 | 3.9 | 4.3 | 0.7 | 1 | 0.95 | 3 | |
| K1c ISO 13586 | in MPa · √m | 0.67 | 0.58 | 0.92 | 0.61 | 0.52 | — | 0.55 | 0.57 | 0.65 | |
| DMTA | TG G" | 163 | 182 | 165 | 133_180_240 | 98 | 112 | 210 | 160 | 70 | 139 |
| | Tg tan delta | 203 | 213 | 178 | 215_265 | 183 | 188 | 235 | 207 | 117 | 150 |

The invention claimed is:

1. A method for producing a cured polymer composition comprising at least one oxazolidinone ring and at least one isocyanurate ring, the method comprising the following steps:
   (1) providing a liquid reaction mixture, comprising:
      (a) at least one liquid, aromatic epoxy resin;
      (b) at least one liquid, aromatic polyisocyanate; and
      (c) a catalyst composition, comprising an ionic compound of formula (I)

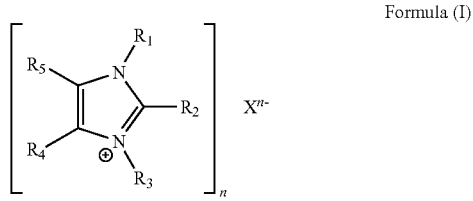

Formula (I)

wherein
      $R_1$ and $R_3$ are each selected independently of one another from the group consisting of substituted or unsubstituted, linear or branched alkyl having 1 to 20 carbon atoms, substituted or unsubstituted, linear or branched alkenyl having 3 to 20 carbon atoms, and substituted or unsubstituted aryl having 5 to 20 carbon atoms;
      $R_4$ and $R_5$ are each selected independently of one another from the group consisting of hydrogen, substituted or unsubstituted, linear or branched alkyl having 1 to 20 carbon atoms, substituted or unsubstituted, linear or branched alkenyl having 3 to 20 carbon atoms, substituted or unsubstituted, linear or branched alkoxy having 1 to 20 carbon atoms, and substituted or unsubstituted aryl having 5 to 10 carbon atoms; or
      $R_1$ and $R_5$ and/or $R_3$ and $R_4$ or $R_4$ and $R_5$, together with the carbon or nitrogen atoms to which they are bound, can form a 5- or 6-membered substituted or unsubstituted cycloalkyl, cycloheteroalkyl, aryl or heteroaryl ring, wherein the cycloheteroalkyl or heteroaryl ring comprises 1 to 3 heteroatoms selected from O, N and S;
      R2 is hydrogen;
      X is an anion not including $Fl^-$, $Cl^-$, $Br^-$ or $I^-$; and
      n is 1, 2 or 3;
   wherein the at least one epoxy resin, relative to the at least one polyisocyanate, is used in amounts so that the molar equivalent ratio of epoxide groups to isocyanate groups is in the range of 0.4 to 1; and
   (2) curing the reaction mixture so as to obtain a cured polymer composition comprising at least one oxazolidinone ring and at least one isocyanurate ring.

2. The method according to claim 1, wherein the at least one epoxy resin is a glycidyl ether.

3. The method according to claim 1, wherein the at least one epoxy resin is a bisphenol diglycidyl ether.

4. The method according to claim 1, wherein the at least one polyisocyanate is methylene diphenyl diisocyanate (MDI).

5. The method according to claim 1, wherein the catalyst composition further comprises at least one nitrogen-containing base.

6. The method according to claim 1, wherein the catalyst composition further comprises at least one non-ionic, nitrogen containing base which comprises at least one tertiary nitrogen atom and/or an imine nitrogen atom.

7. The method according to claim 1, wherein 0.01 to 10 wt. % of the catalyst composition is employed, based on the total weight of the reaction mixture.

8. The method according to claim 1, wherein:
   the reaction mixture is free from epoxide curing agents which catalyze a polyaddition reaction;
   the reaction mixture has a viscosity of <100 mPas at a temperature of 120° C.;
   the cured polymer composition has a modulus of elasticity of more than 2500 N/mm$^2$; and/or
   the cured polymer composition has a glass transition temperature of more than 150° C.

9. The method according to claim 1, wherein:
   a) the reaction mixture in step (2) is cured at a temperature between 10° C. and 230° C. for 0.01 hours to 10 hours; or
   b) the reaction mixture in step (2) is initially cured at a temperature between 50° C. and 130° C. for 0.1 hours to 3 hours and subsequently is cured at a temperature between 110° C. and 190° C. for 0.1 hours to 3 hours.

10. The method according to claim 1, wherein the method is a resin transfer molding (RTM) method, and the reaction mixture is a reactive injection resin.

11. The method according to claim 10, wherein step (1) comprises injecting the injection resin into a molding tool, into which fiber prewovens/preforms have been placed.

12. A cured polymer composition, obtainable by a method according to claim 1.

13. The cured polymer composition according to claim 12, wherein the cured polymer composition is a fiber-reinforced molded part further comprising a fiber prewoven/preform therein.

14. The method according to claim 8, wherein the cured polymer composition has a modulus of elasticity of more than 3000 N/mm$_2$.

15. The method of claim 1 wherein X is selected from dicyandiamide anion, $OH^-$, $HSO_3^-$, $NO_2^-$, $NO_3^-$, $PF_6^-$, $ClO_4^-$, acetate, citrate, formate, glutarate, lactate, malate, malonate, oxalate, pyruvate, tartrate, cyanocyanamide, $SCN^-$ and $P(OEt)_2O_2^-$.

16. A method for transfer molding (RTM) method, comprising:
   providing an open mold;
   providing a fiber component comprising a plurality of fibers formed in a shape;
   disposing the fiber component into the open mold;
   closing the mold;
   providing a liquid reaction mixture, comprising:
      at least one liquid, aromatic epoxy resin;
      at least one liquid, aromatic polyisocyanate; and
      a catalyst composition comprising an ionic compound of Formula (I)

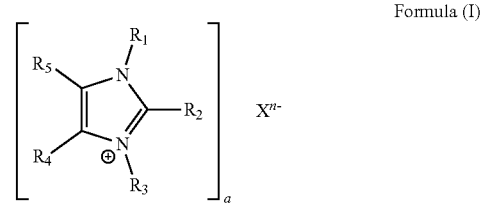

Formula (I)

wherein
- $R_1$ and $R_3$ are each selected independently of one another from the group consisting of substituted or unsubstituted, linear or branched alkyl having 1 to 20 carbon atoms, substituted or unsubstituted, linear or branched alkenyl having 3 to 20 carbon atoms, and substituted or unsubstituted aryl having 5 to 20 carbon atoms;
- $R_4$ and $R_5$ are each selected independently of one another from the group consisting of hydrogen, substituted or unsubstituted, linear or branched alkyl having 1 to 20 carbon atoms, substituted or unsubstituted, linear or branched alkenyl having 3 to 20 carbon atoms, substituted or unsubstituted, linear or branched alkoxy having 1 to 20 carbon atoms, and substituted or unsubstituted aryl having 5 to 10 carbon atoms; or
- $R_1$ and $R_5$ and/or $R_3$ and $R_4$ or $R_4$ and $R_5$, together with the carbon or nitrogen atoms to which they are bound, can form a 5- or 6-membered substituted or unsubstituted cycloalkyl, cycloheteroalkyl, aryl or heteroaryl ring, wherein the cycloheteroalkyl or heteroaryl ring comprises 1 to 3 heteroatoms selected from O, N and S;
- $R_2$ is hydrogen;
- X is an anion; and
- n is 1, 2 or 3;

wherein the at least one epoxy resin, relative to the at least one polyisocyanate, is used in amounts so that the molar equivalent ratio of epoxide groups to isocyanate groups is in the range of 0.4 to 1;

loading the liquid reaction mixture into the mold having the fiber component disposed therein; and curing the reaction mixture so as to obtain a fiber reinforced part comprising the fiber component disposed in a cured polymer composition comprising at least one oxazolidinone ring and at least one isocyanurate ring.

17. The method of claim 16 wherein the catalyst composition comprising at least one nitrogen-containing base comprises at least one non-ionic, nitrogen containing base which comprises at least one tertiary nitrogen atom and/or an imine nitrogen atom.

18. The method of claim 1 wherein the liquid reaction mixture is free of solvent.

* * * * *